Feb. 6, 1934.  H. W. LORD  1,946,290
SHORT INTERVAL TIMER
Filed Aug. 3, 1932
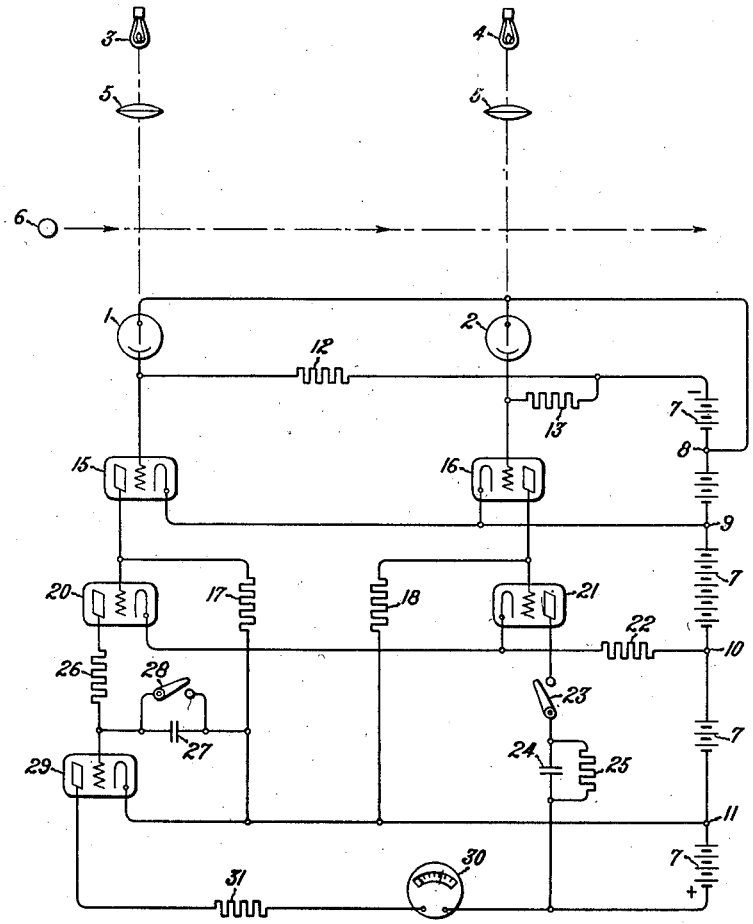
Inventor:
Harold W. Lord,
by Chas. E. Tuella
His Attorney.

Patented Feb. 6, 1934

1,946,290

UNITED STATES PATENT OFFICE 1,946,290

SHORT INTERVAL TIMER

Harold W. Lord, Schenectady, N. Y., assignor to General Electric Company, a corporation of New York Application August 3, 1932. Serial No. 627,389

5 Claims. (Cl. 161—18)

My invention relates to short interval timers and more particularly to timers useful in measuring the speed of rapidly moving objects. It is the object of my invention to provide an improved timer which is simple in construction, reliable in operation and is unaffected by the inertia of moving parts.

My invention will be better understood from the following description taken in connection with the accompanying drawing, and its scope will be pointed out in the appended claims.

In accordance with my invention I measure extremely short periods of time by supplying a capacitor for such a period with charging current from a known potential source and subsequently measure the charge received by the capacitor.

In the single figure of the drawing which is a circuit diagram illustrating one embodiment of my invention I have shown a form of timer which is adapted for the measurement of the speed of a rapidly moving object. For this purpose I employ the photo-electric devices 1 and 2 associated with which are the light sources 3 and 4 respectively, each provided with a suitable optical system represented at 5 by which a narrow beam of light is focused on the corresponding photo-electric device. The two beams of light are arranged preferably at right angles to the path of movement of the object whose speed is to be measured and at a known fixed distance apart, the arrangement being such that the object represented for example at 6 successively intercepts the light beams. The devices 1 and 2 as well as the remaining apparatus in the present embodiment are shown supplied by direct current from the battery 7 which is represented as having taps 8, 9, 10, and 11 by which the battery is divided into sections. The anodes of the two devices 1 and 2 connect with the tap 8 while the cathodes connect with the negative end of the battery through the resistances 12 and 13 respectively. The two electron discharge amplifying devices 15 and 16, which may be tubes of the high vacuum type, have their cathodes connected by common conductor with the tap 9 and have their control grids connected with the cathodes respectively of the photo devices 1 and 2. The anodes of devices 15 and 16 connect respectively through resistances 17 and 18 with the tap 11. Vapor electric or arc discharge devices 20 and 21 have their cathodes connected with the tap 10 of the battery through the common resistance 22. The grids of these devices connect respectively with the anodes of devices 15 and 16. The anode of device 21 connects with the positive end of the battery through the switch 23 and the capacitor 24, the latter being shunted by a resistor 25. The anode of device 20 connects with tap 11 through the resistor 26 and capacitor 27 the amount of charge of which capacitor is a measure of the time interval to be measured. Capacitor 27 is shunted by switch 28 by which it may be completely discharged before the time measurement is made. In order to measure the charge received by capacitor 27 I have shown the electron discharge device 29, which may be of the high vacuum type and whose cathode-grid circuit connects with the terminals of capacitor 27 and in whose cathode-anode circuit is the milliammeter 30 in series with the resistance 31.

The operation of the above described apparatus is as follows: As long as the two light beams from the sources 3 and 4 fall uninterruptedly upon the photo devices 1 and 2 respectively the impedances of the anode circuits of devices 15 and 16 are a minimum. Hence the control grids of devices 20 and 21 are held negative and these devices therefore do not pass current. Prior to making a speed measurement, switch 28 is closed and opened in order to completely discharge capacitor 27. As an object 6 in its movement intercepts the light beam from source 3 the resistance of device 1 increases causing the anode impedance of the device 15 to increase to such an extent that the control grid of device 20 becomes sufficiently positive to cause this device to begin to pass current. Since capacitor 27 is in the anode circuit of device 20, charging current for the capacitor will flow from that part of the battery between taps 10 and 11 and will continue until stopped by the interception of the light beam from source 4. A re-establishment of the beam from source 3 in the meantime will not stop the flow of charging current to the capacitor 27 for, since device 20 is a vapor device, its grid loses control after the device begins to conduct current. Interception of the latter beam operates in a manner similar to that already described for the light beam from source 3 causing the device 16 to have the resistance of its anode circuit increased thereby causing the device 21 to begin passing current, it being understood that switch 23 in the anode circuit of this device is closed. By the operation of device 21 condenser 24 is charged and the cathodes of both devices 20 and 21 are raised substantially to the potential of the positive end of the battery at the moment 21 starts conducting. Device 20 accordingly ceases to pass current and therefore the charging of condenser 27 is terminated. By opening switch 23 the flow of plate current in device 21 may be stopped. Capacitor 27 is now charged an amount corresponding with the length of time between the interception of the two light beams. This capacitor and its connections are well insulated so that leakage is kept very low. The amount of charge given to the capacitor 27 controls the current flow through the anode circuit of device 29 and this flow in the present case is measured by the milliammeter 30. Even though this instrument may be sluggish in its action the leakage of capacitor 27 is so small that there is ample time to read the charge as indicated by the milliammeter. This instrument may be calibrated in units of time or may be calibrated to read directly in terms of speed of the object 6, as for example in feet per second. Under certain circumstances the capacitor 24 and the resistance 25 may be eliminated but in that case I have found that the current required after device 21 begins passing current is somewhat higher than if these members are employed in the circuit.

While I have shown means for initiating and terminating the charge of capacitor 27 dependent upon the passage of an object 6 through the two light beams, it will be understood that various other means may be employed for tripping the devices 20 and 21 whereby the time interval between the tripping of these two devices governs the amount of charge stored in capacitor 27.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:

1. A short interval timer comprising a first and a second photo-electric device, means for directing a separate light beam into each device, a capacitor, a source of charging current therefor, a vapor electric discharge device responsive to an interception of the light beam of the first device for initiating the charging of the capacitor from said source, a vapor electric discharge device responsive to an interception of the light beam of the second device for terminating the charging of the capacitor and means for indicating the total charge received by the capacitor.

2. A short interval timer comprising a first and a second photo-electric device, means for directing a separate light beam into each device, a capacitor, a source of charging current therefor, a first vapor electric discharge device connected in series with said capacitor and source and controlled by said first photo-electric device, a second vapor electric discharge device controlled by said second photo-electric device for causing the first vapor device to cease passing current and means for indicating the total charge received by the capacitor.

3. A short interval timer comprising a first and a second photo-electric device, means for directing a separate light beam into each device, a capacitor, a source of charging current therefor, a first vapor electric discharge device connected in series with said source and said capacitor for initiating the charging of the capacitor in response to an interception of the beam to the first photo-electric device, means controlled by an interception of the beam to the second photo-electric device for rendering the cathode of said vapor device positive with respect to the anode thereof and means for measuring the charge received by the capacitor.

4. A short interval timer comprising a first and a second photo-electric device, means for directing a separate light beam into each device, a capacitor, a source of charging current therefor, a first vapor electric discharge device connected in series with said source and said capacitor for initiating the charging of the capacitor in response to an interception of the beam to the first photo-electric device, a source of potential positive with respect to the anode of said vapor device, means controlled by an interception of the beam to said second photo-electric device for connecting said source of potential with the cathode of said vapor device and means for measuring the charge received by the capacitor.

5. A short interval timer comprising a first and a second photo-electric device, means for directing a separate light beam into each device, a capacitor, a source of charging current therefor, a first vapor electric discharge device connected in series with said source and said capacitor for initiating the charging of the capacitor in response to an interception of the beam to the first photo-electric device, a source of potential positive with respect to the anode of said vapor device, a second vapor electric device controlled by an interception of the beam to the second photo-electric device and arranged to connect said source of potential with the cathode of said first vapor device and means for indicating the charge received by the capacitor.

HAROLD W. LORD.